United States Patent
Chen et al.

(10) Patent No.: US 6,904,015 B1
(45) Date of Patent: Jun. 7, 2005

(54) CONGESTION AVOIDANCE PROFILES IN A PACKET SWITCHING SYSTEM

(75) Inventors: Yao-Min Chen, San Jose, CA (US); Heeloo Chung, San Francisco, CA (US)

(73) Assignee: Force10 Networks, Inc., Milpitas, CA (US)

( * ) Notice: Subject to any disclaimer, the term of this patent is extended or adjusted under 35 U.S.C. 154(b) by 852 days.

(21) Appl. No.: 09/653,467

(22) Filed: Sep. 1, 2000

(51) Int. Cl.[7] .......................... G01R 31/08; H04L 12/28; H04L 12/54
(52) U.S. Cl. ...................... 370/235; 370/429; 370/412; 370/389
(58) Field of Search ................................. 370/235, 236, 370/232, 234, 384, 398, 422, 428, 392

(56) References Cited

U.S. PATENT DOCUMENTS

| | | | | |
|---|---|---|---|---|
| 6,141,323 | A | * 10/2000 | Rusu et al. | 370/236 |
| 6,556,578 | B1 | * 4/2003 | Silberschatz et al. | 370/412 |
| 6,560,198 | B1 | * 5/2003 | Ott et al. | 370/235 |
| 6,606,301 | B1 | * 8/2003 | Muller et al. | 370/230 |
| 2002/0009051 | A1 | * 1/2002 | Cloonan | 370/232 |

OTHER PUBLICATIONS

Sally Floyd and Van Jacobson; *Random Early Detection Gateways for Congestion Avoidance*; IEEE/ACM Transactions on Networking; Aug. 1993; pp. 1–32.

B. Braden et al.; *IETF RFC 2309, Recommendations on Queue Management and Congestion Avoidance in the Internet*; info.internet.isi.edu; Apr. 1998; pp. 1–16.

*Random Early Detection*; Cisco Technology; Jul. 21, 1998 downloaded from ftp–eng.cisco.com Jun. 14, 2000; pp. 1–4.

* cited by examiner

*Primary Examiner*—Hanh Nguyen
(74) *Attorney, Agent, or Firm*—Haynes and Boone, LLP

(57) ABSTRACT

Methods and apparatus for an improvement on Random Early Detection (RED) router congestion avoidance are disclosed. A traffic conditioner stores a drop probability profile as a collection of configurable profile segments. A multi-stage comparator compares an average queue size (AQS) for a packet queue to the segments, and determines which segment the AQS lies within. This segment is keyed to a corresponding drop probability, which is used to make a packet discard/admit decision for a packet.

In a preferred implementation, this computational core is surrounded by a set of registers, allowing it to serve multiple packet queues and packets with different discard priorities. Each queue and discard priority can be keyed to a drop probability profile selected from a pool of such profiles. This provides a highly-configurable, inexpensive, and fast RED solution for a high-performance router.

42 Claims, 7 Drawing Sheets

CONGESTION AVOIDANCE PROFILES IN A PACKET SWITCHING SYSTEM

FIELD OF THE INVENTION

This present invention relates to data packet routing and routers, and more particularly to a method and apparatus for implementing random early detection of congestion in a router queue.

BACKGROUND OF THE INVENTION

In packet-switched networks, routers, switches, and gateways are examples of the types of network devices that effect delivery of packets from source endpoints to destination endpoints. These routing devices receive network packets at one or more ingress ports. For each received packet, the routing device examines one or more of the packet's headers and then determines an egress port that will move the packet most effectively towards its destination. The device switches the packet to that egress port, where it will be placed back on the network to wend its way towards the destination endpoint.

Routing devices generally queue a packet in an internal queue until the packet can be switched to the appropriate egress port, and/or until the egress port has transmitted earlier-arriving packets. These queues must generally be large enough to accommodate traffic bursts—such a burst can occur, e.g., when packets arriving at roughly the same time at multiple ingress ports must be switched to the same egress port. But if the queues are allowed to grow too large, arriving packets are unduly delayed in the router, resulting in service degradation for many forms of traffic. This condition is generally referred to as router "congestion".

Sophisticated routing devices employ active queue management strategies to keep queue sizes within a desired operating range, thereby avoiding congestion. For example, because most of the traffic on a packet-switched network is not allotted a dedicated circuit, transmitting devices are usually expected to conform to a traffic profile that specifies an average and a peak data rate for that device. When a transmitting device fails to conform to its profile, a router may choose to "drop", or discard, some of the packets from the device in order to place the data rate back within profile. By dropping packets from the offending endpoint, the router prevents that endpoint from consuming an unfair portion of a router queue. Also, TCP and TCP-like applications interpret packet loss as an indicator of congestion, scale back their rate, and then ramp back up in a "slow-start" mode.

Unfortunately, transient congestion can occur at a router even when all endpoints are behaving in a reasonable manner. Under these conditions, the router must generally choose some packets to be discarded, hopefully in a manner that is both "fair" and causes traffic to return to a reasonable level. Early routers often implemented Drop Tail or Random Drop algorithms. Drop Tail simply drops a packet which arrives to a full queue. Random Drop drops one packet at random from the queue when a packet arrives to a full queue.

Researchers found that several undesirable situations can arise with the Drop Tail and Random Drop algorithms. Because these algorithms were reactive rather than proactive, no control was exercised until congestion was actually occurring. This results in a phenomenon termed "global synchronization", which causes a large number of senders to reduce their rates in lockstep as a result of congestion, resulting in periods of high drop rates followed by periods of network underutilization. It was also found that misbehaving users were not always effectively controlled by these schemes.

Floyd and Jacobson proposed a different congestion avoidance algorithm to deal with these problems. "Random Early Detection Gateways for Congestion Avoidance", *IEEE/ACM Trans. On Networking*, August 1993. The desired congestion response of the Random Early Detection (RED) algorithm proposed by Floyd and Jacobson is depicted in FIG. 1. An average queue size avg, i.e., a low-pass filtered version of the instantaneous queue size, is calculated. When avg is below a lower threshold $min_{th}$, no packets are dropped. When avg is above an upper threshold $max_{th}$ (which is preferably less than the queue's maximum capacity), all packets are dropped. When avg is between these two extremes, an initial packet-marking probability $p_b$ varies linearly between 0 and $P_{mark}$:

$$p_b \leftarrow P_{mark}(\text{avg}-min_{th})/(max_{th}-min_{th}).$$

The final packet-marking probability $p_a$ increases slowly as the count increases since the last marked packet:

$$p_a \leftarrow p_b/(1-\text{count} \cdot p_b).$$

Basing the final packet-marking probability on count ensures that the algorithm will not wait too long before marking a packet.

When a packet arrives at a RED-enabled queue, the average queue size is used to determine an operating point on the curve of FIG. 1. The operating point, together with count, defines a packet discard probability $p_a$. A random trial determines whether the current packet will be discarded or not, with the "discard" outcome having a probability equal to the packet discard probability $p_a$.

The RED algorithm has several desirable characteristics. Because it uses a filtered queue size, it does not react strongly to short-duration traffic bursts. The probability that a given endpoint's traffic will be dropped is roughly proportional to that endpoint's share of the overall traffic load in the queue. Traffic is managed before congestion reaches a critical level. And dropped packets are spread somewhat randomly within the traffic pattern, instead of being bunched together.

FIG. 2 shows one variation on the RED congestion avoidance approach. Traffic that is "out-of-profile", i.e., not conforming to its allowable rates, is controlled using a first RED threshold set $Omin_{th}$ and $Omax_{th}$. Traffic that is "in-profile" is controlled using a second RED threshold set $Imin_{th}$ and $Imax_{th}$. In operation, out-of-profile traffic will be dropped under the FIG. 2 scheme at a higher rate than in-profile traffic for most average queue sizes.

SUMMARY OF THE INVENTION

Today's high-performance routers process packets at extremely high data rates, and thus packet discard decisions must be made quickly, if at all. At the same time, these routers are often called upon to provide differentiated services, i.e., different classes of traffic may exist, and each class may receive more or less favorable treatment by the router than other classes receive. Such routers often also monitor and police traffic, and are expected to deal with misbehaving users in a fair and consistent approach. The disclosed embodiments describe improvements on the basic RED approach that can be beneficial, e.g., in such a high-speed, differentiated-services router.

It is recognized herein that a wire-speed RED implementation is desirable. Although prior art RED implementations use software and a CPU, some of the embodiments described herein use hardware, e.g., an application-specific integrated circuit (ASIC), to provide a wirespeed implementation of RED. These embodiments "snoop" a packet as the packet proceeds through a pipeline to be distributed to its appropriate queue, and produce a drop/no-drop decision for the packet before it reaches the end of the pipeline. With such an approach, RED can be implemented at low cost in a high-performance router.

It is also recognized herein that it may be desirable to allow a packet discard probability curve to approximate a function other than a linear function, and/or to have that function be changeable by the user. This presents a challenge when the RED implementation must run at wire speed, and/or when the RED implementation resides on a circuit with no complex mathematical capabilities. Some of the embodiments described herein meet this challenge with user-defined discard probability curves, represented by a finite number of parameters, that require only simple operations such as shifts, adds, and compares. The preferred parametric representation is as a set of segments (i.e., a "profile"), each segment corresponding to an assigned drop probability and representing a specified range of average queue sizes. By manipulating a profile's segment positioning and drop probabilities, a user can approximate virtually any function that is desired.

It is recognized herein that it may be desirable, where multiple packet queues exist, to allow different RED profiles to be used with different queues. In some of the preferred embodiments, a shared "pool" of RED profiles is provided. Each queue can be associated with whichever one of the pooled profiles is desired. This approach is easier for the user, who does not have to parameterize a profile for each queue individually. It is also more efficient in a hardware implementation where literally hundreds of queues may be served by a single RED circuit, since the RED circuit does not have to store a separate profile for each packet queue. This approach also scales easily to accommodate the concept of "drop priority", where more than one RED profile may exist for a given queue, keyed to a drop priority identifier. The profile selected for a given data packet can depend not only on that packet's destination queue, but on that packet's drop priority.

In one aspect of the invention, a method of implementing random early detection of congestion for a data packet queue is disclosed. This method uses a configurable segment-based drop probability profile to make a drop/no-drop decision for a data packet.

In a related aspect of the invention, a method of implementing random early detection of congestion for multiple data packet queues is disclosed. This method maintains a pool of drop probability profiles, and allows each data packet queue to associate with at least one profile selected from the pool. The method uses the queue/pooled-profile association to select a drop probability profile for each packet, and use that profile to arrive at a drop/nodrop decision for that packet.

Although one preferred method of implementing each of these methods is with a special-purpose chip, the methods are also amenable to software implementation. Thus in another aspect of the invention, the disclosed methods can be implemented in an apparatus comprising a computer-readable medium containing computer instructions that, when executed, cause a processor or multiple communicating processors to perform that method.

An integrated circuit is also disclosed having hardware tailored to a RED implementation capable of serving multiple queues. A profile register stores an array of segment-based drop probability profiles. A profile matcher accepts a data packet queue identifier and selects an active drop probability profile, from the array of drop probability profiles, that is associated with the data packet queue identifier. A segment selector accepts an average queue size AQS associated with the selected data packet queue and the active drop probability profile. The selector uses this information to identify the segment of the active profile within which AQS falls. And a probability comparator accepts a drop probability corresponding to the segment identification from the segment selector, and produces a random packet-discard signal with a probability approximately equal to the drop probability.

A packet routing device is also disclosed. The device comprises a packet pipeline to receive and delay a packet, and a multiple-queue packet memory to receive a packet into the queue designated for that packet, when that packet reaches the end of the packet pipeline without being discarded. The device further comprises a random early detection traffic conditioning circuit to snoop queue information from the packet while the packet is in the pipeline. The traffic conditioning circuit has the capability to select a segment-based drop probability profile corresponding to the queue information and then produce a packet discard/admit decision, based on that profile, before the packet reaches the end of the pipeline.

BRIEF DESCRIPTION OF THE DRAWING

The invention may be best understood by reading the disclosure with reference to the drawing, wherein.

DETAILED DESCRIPTION OF THE PREFERRED EMBODIMENTS

Figure 1:
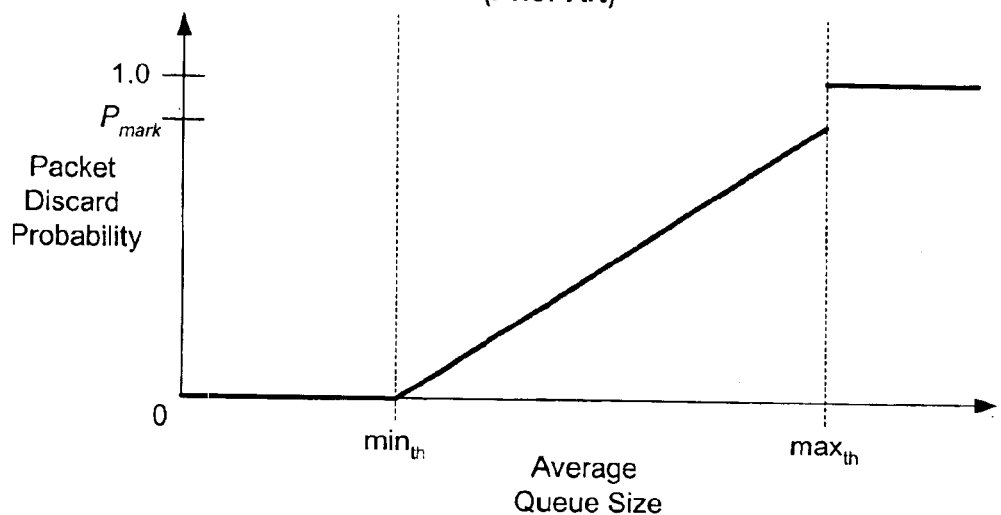
FIGS. 1 and 2 illustrates packet discard probability vs. average queue size for two prior-art RED approaches.
Figure 2:
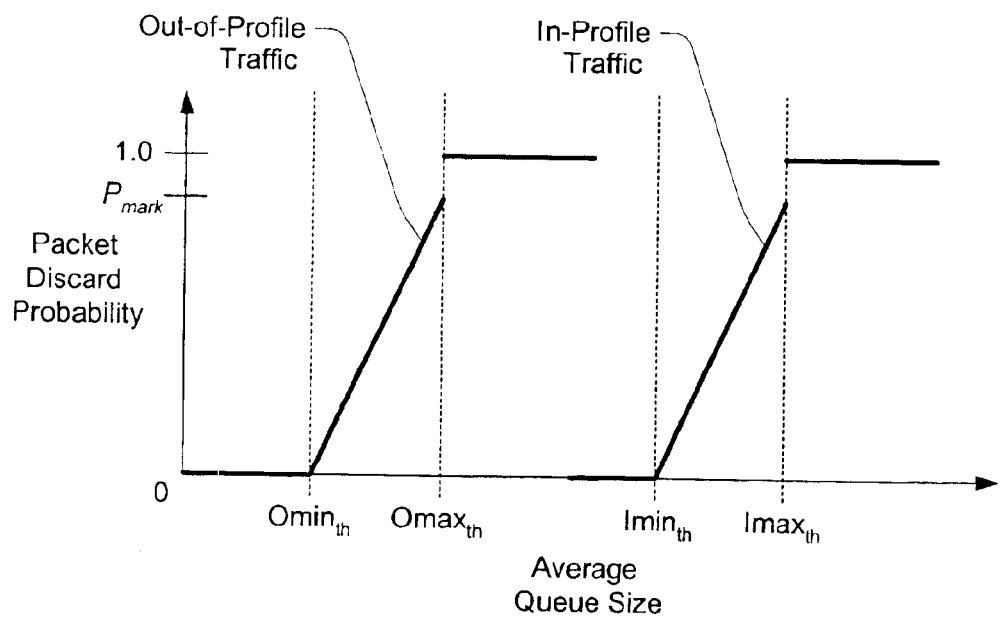

Several terms have been assigned particular meanings within the context of this disclosure. As used herein, "drop" and "dropping" encompasses both the concept of discarding a packet and the concept of marking a packet to indicate congestion. A "drop probability" need not be in the range [0,1] understood for mathematical probabilities—rather, the drop probability occupies a range of values that, when used in a method or device, produces a desired probabilistic result. A "segment-based" drop probability profile requires more than one segment. For instance, FIG. 1 does not illustrate such a drop probability profile as it has only one linear segment (the never-drop region below $min_{th}$ and the always-drop region above max$_{th}$ are not segments, since no probabilistic outcome is associated with them). An "average" queue size refers to a moving average. Something that is "configurable" can have its value electronically changed through a computer interface, without requiring manual alteration of a circuit, recompilation of software, etc. A "packet-routing device" is a multi-port device that performs packet switching between its ports. Routers, switches, access concentrators, and gateways are common examples of packet routing devices.

Figure 3:
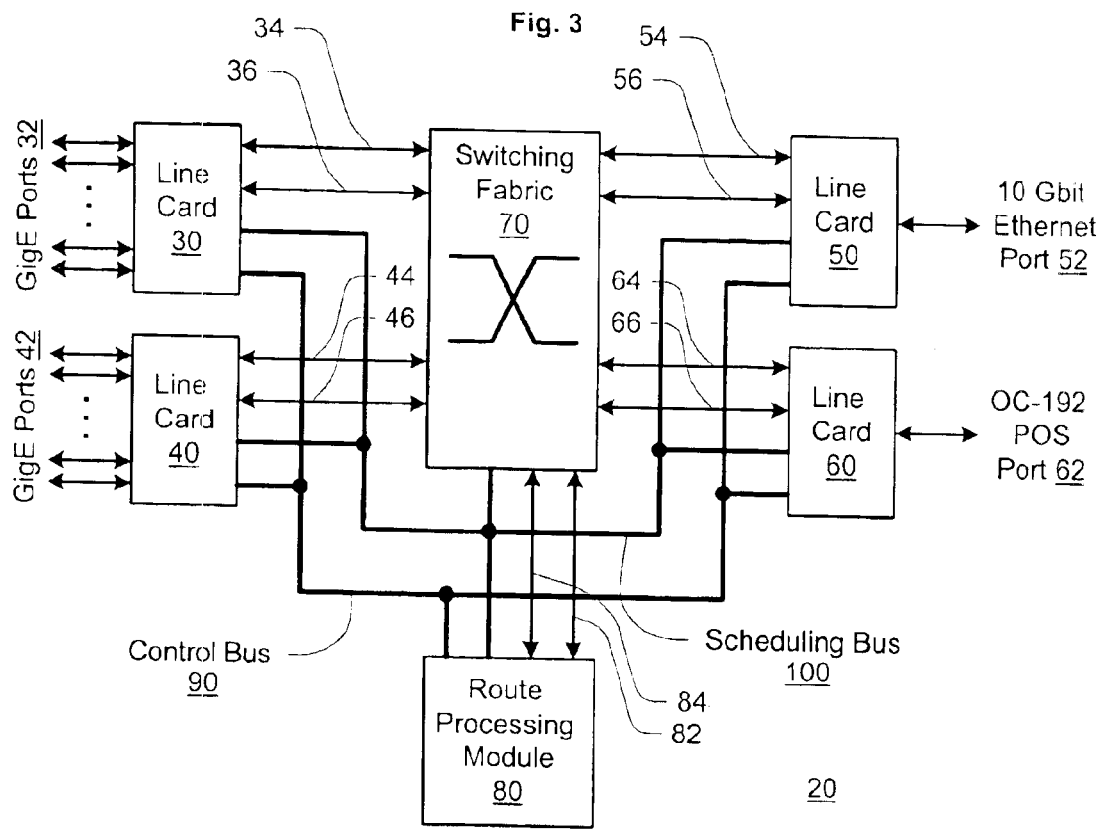
FIG. 3 shows a high-level block diagram for a router embodiment that can embody the invention.

FIG. 3 shows a high-level block diagram for a packet-routing device 20. Line cards 30, 40, 50, and 60 provide physical ports to the device. For instance, line card 30 can provide up to 24 Gigabit Ethernet ports 32 to device 20, and line card 40 can have similar capabilities. Line card 50 provides two 10-Gigabit Ethernet ports 52, and line card 60 provides an OC-192 POS (Packet-Over-Sonet) port 62. Although four line cards are shown, many systems provide slots to accommodate many more cards, e.g., up to fourteen line cards in one embodiment. The user can configure device 20 to accommodate different traffic models and physical port mixes by the appropriate selection of line cards.

Switching fabric 70 moves each data packet from its ingress port/line card to its egress port/line card. Switching fabric 70 connects to each line card through two switching fabric port connections (see, e.g., port connections 34, 36 to line card 30). Switching fabric 70 can be rapidly reconfigured, e.g., at one instant, it may be switching packets from ingress port 34 to egress port 54 and from ingress port 36 to egress port 66, and at the next instant, it could be switching packets from ingress port 34 to egress port 44. At the same time, packets from ingress port 54 could be routed to egress port 46, and packets from ingress port 64 could be routed to egress port 34, for example.

Route processing module (RPM) 80 has several duties. RPM 80 is responsible for overall system operation, i.e., recognizing and booting new line cards, identifying faulty line cards, packet route discovery, and sharing routing table information with the line cards. RPM 80 also provides a user interface to allow a system operator to configure the system and view system parameters. For each of these functions, RPM generally communicates with the line cards over control bus 90.

Another duty of RPM 80 is scheduling switching fabric 70. In a preferred implementation, switching fabric 70 is reconfigured by RPM 80 every epoch, where an epoch is a selected time interval. RPM 80 uses scheduling bus 100 to communicate to switching fabric 70 and to line cards 30, 40, 50, 60 the switching fabric configuration for the next epoch. RPM 80 attempts to schedule as many fabric ports as possible during each epoch, and to ensure that data is handled promptly.

RPM 80 also maintains its own switching fabric port connections 82, 84, allowing it to receive and transmit packets over any of the line card physical ports.

Figure 4:
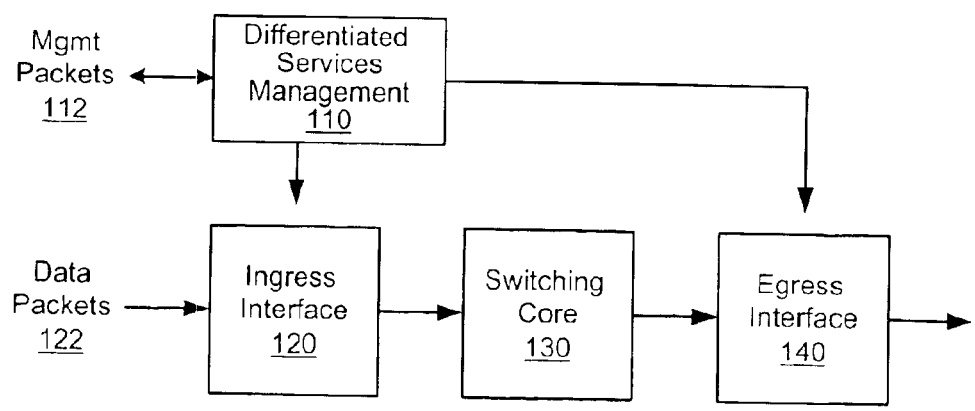
FIG. 4 shows a high-level model for providing differentiated services in a router.

FIG. 4 illustrates how the concept of "differentiated services management" can be applied in a packet routing device such as device 20. Differentiated services management block 110 is, i.e., a software process running on RPM 80. Block 110 receives management packets 112 containing instructions as to how packets associated with the various ports of device 20 should be treated. For instance, each port can have committed and peak data rates for its service contract. The instructions may further specify how different classes of packets are to be prioritized, both in RED and in queue priority. Management block 110 implements the instructions by setting appropriate parameters in ingress interface 120 and egress interface 140. Typically, each switching fabric port connection will have at least one such ingress interface and at least one such egress interface.

Figure 5:
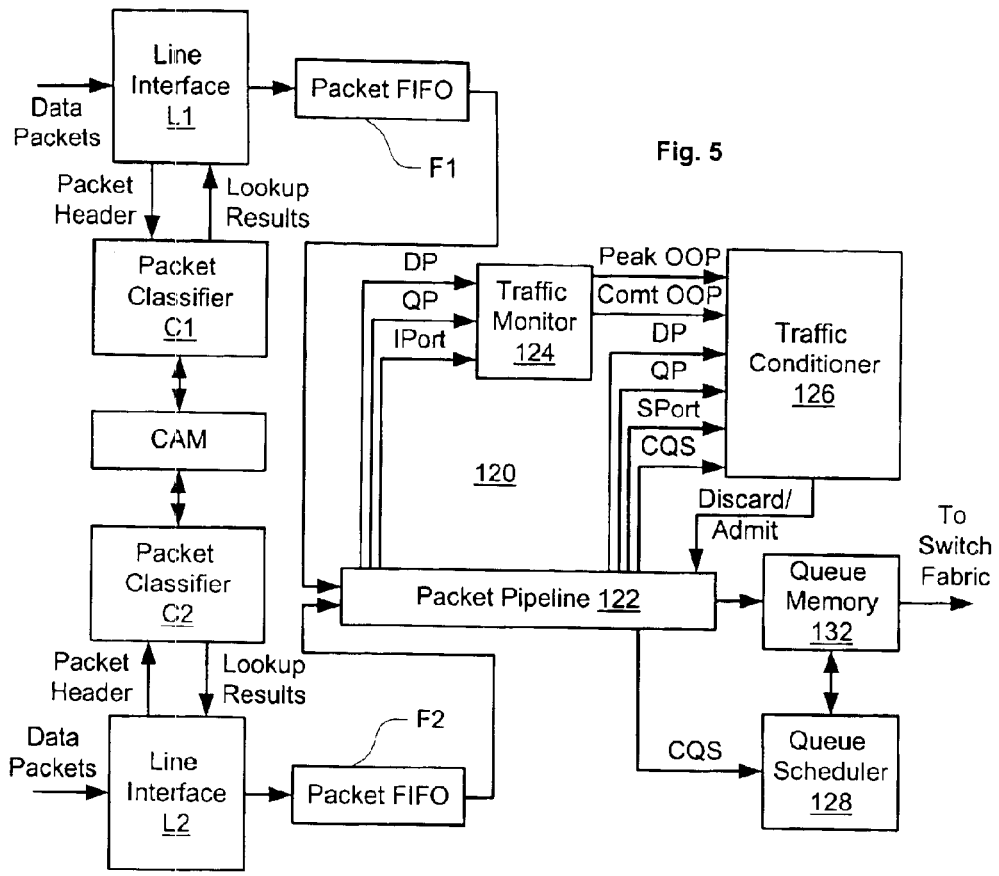
FIG. 5 contains a block diagram for ingress packet processing according to an embodiment of the invention.

FIG. 5 illustrates a more-detailed block diagram for ingress interface 120 of FIG. 4, e.g., as implemented on line card 30, although other line card implementations would be similar. In particular, only two line interfaces, L1 and L2, are shown, although line card 30 is described as having twelve such interfaces per switching fabric connection. Two interfaces are sufficient to illustrate which circuitry is and is not replicated per-port, and thus the other ten interfaces have been omitted for clarity. In line card 50 or 60, line interface L2 and its related circuitry would not be needed.

Initial processing of a packet by ingress interface 120 is as follows. When a packet begins to arrive at line interface L1, packet classifier C1 receives the packet header, and uses selected header fields to perform a lookup operation in the CAM (Content-Addressable Memory). The CAM lookup returns both the switching fabric port to the destination line card (SPort) and the destination port on that line card (OPort). Several packet classification parameters are also determined during lookup: traffic class, or queuing priority (QP), which will be used to assign the packet to one of eight queues associated with the SPort, ODSCP (Outgoing Differentiated Services Code Point), which is a differentiated services header field that is to be inserted in the packet before it leaves the routing device drop precedence; and drop precedence (DP), which is used to differentiate the drop priority for packets sharing the same queue. The drop priority DP preferably takes one of three values corresponding to the "colors" Green, Yellow, and Red. Red packets will generally be dropped before Yellow packets, and Yellow packet will generally be dropped before Green packets. The lookup results are bundled in an internal-use header and prepended to the data packet in packet FIFO F1. Note that packets arriving at line interface L2 experience a similar process, but with classifier C2, FIFO F2, and the shared CAM.

Packets in FIFOs F1 and F2 compete for admission to packet pipeline 122, and are admitted based on a weighted round-robin admission policy. Once a packet is admitted to packet pipeline 122, traffic monitor 124 snoops the packet's DP, QP and IPort (i.e., either L1 or L2 in this example).

Traffic monitor 124 uses dual token buckets to classify the packet according to the packet's DP (if preexisting), QP, and IPort. The first token bucket detects whether traffic from the packet's particular class (QP) and IPort is exceeding a peak rate, and if so, the Peak OOP (Out-of-Profile) signal is asserted to traffic conditioner 126. The second token bucket detects whether traffic from the packet's particular class and IPort is, although not exceeding a peak rate, exceeding a longer-term committed information rate—if so, the Comt (Committed) OOP signal is asserted to traffic conditioner 126.

Traffic conditioner 126 receives Peak OOP and Comt OOP from traffic monitor 124, and snoops the packet's DP, QP, and SPort from packet pipeline 122. Conditioner 126 produces (as will be explained shortly) a discard/admit signal back to packet pipeline 122. If the signal has a value understood as drop, packet pipeline 122 may use the signal to discard the packet before it reaches queue memory 132, or it may simply mark the packet to indicate congestion. Otherwise, when the packet reaches the end of the queue, it will be queued in queue memory 132 according to the packet's SPort and QP.

Packet pipeline 122 tracks the size of each queue in queue memory 132, i.e., when a packet is de-queued, pipeline 122 decrements a value CQS (Current Queue Size) by the packet's size, and when a packet is queued, pipeline 122 increments CQS by the packet's size. Updates to CQS for each queue are supplied to traffic conditioner 126 and queue scheduler 128.

Queue scheduler 128 determines, when a given SPort is enabled, the order in which queues sharing that SPort will be selected to transmit to the switch fabric.

Figure 6:
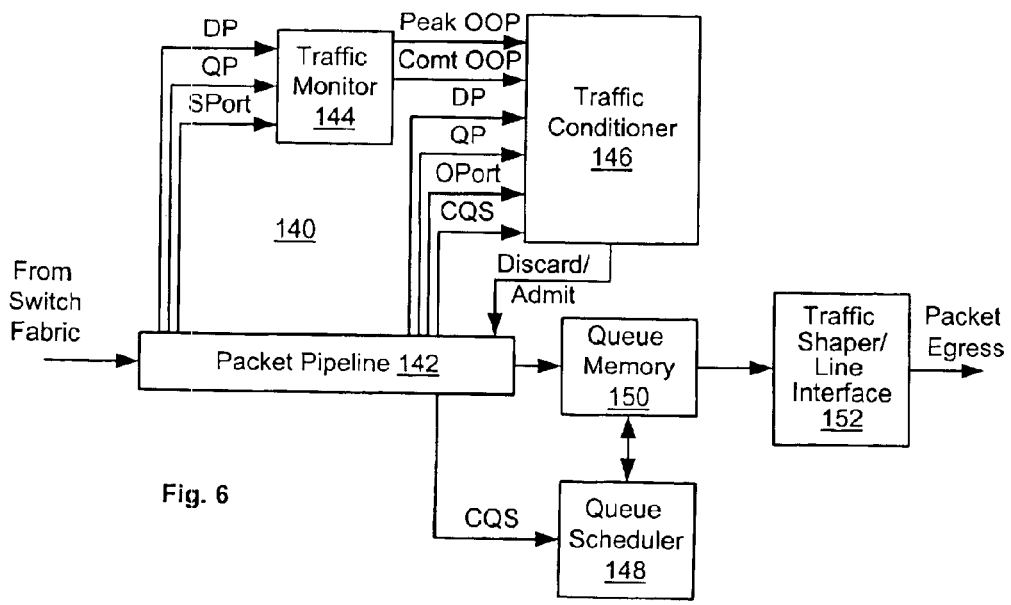
FIG. 6 contains a block diagram for egress packet processing according to an embodiment of the invention.

FIG. 6 illustrates a more-detailed block diagram for egress interface 140 of FIG. 4, e.g., as implemented on line card 50 or 60, although other line card implementations would be similar (but with more egress paths). Egress interface 140 operates much as ingress interface 120 operates, but with the following significant differences. First, no CAM lookup is required, as the lookup has already occurred in the ingress interface, the results appearing in the internal header passed with the packet. Second, traffic monitor 144 uses OPort instead of IPort, to perform traffic rate monitoring based on an output traffic profile. By similar reasoning, traffic conditioner 146 uses OPort instead of SPort. Egress interface 140 typically also must strip the internal header and modify the packet headers as needed. Finally, a traffic shaper 152 is used to conform the outgoing packet rate to the contracted rate.

Figure 7:
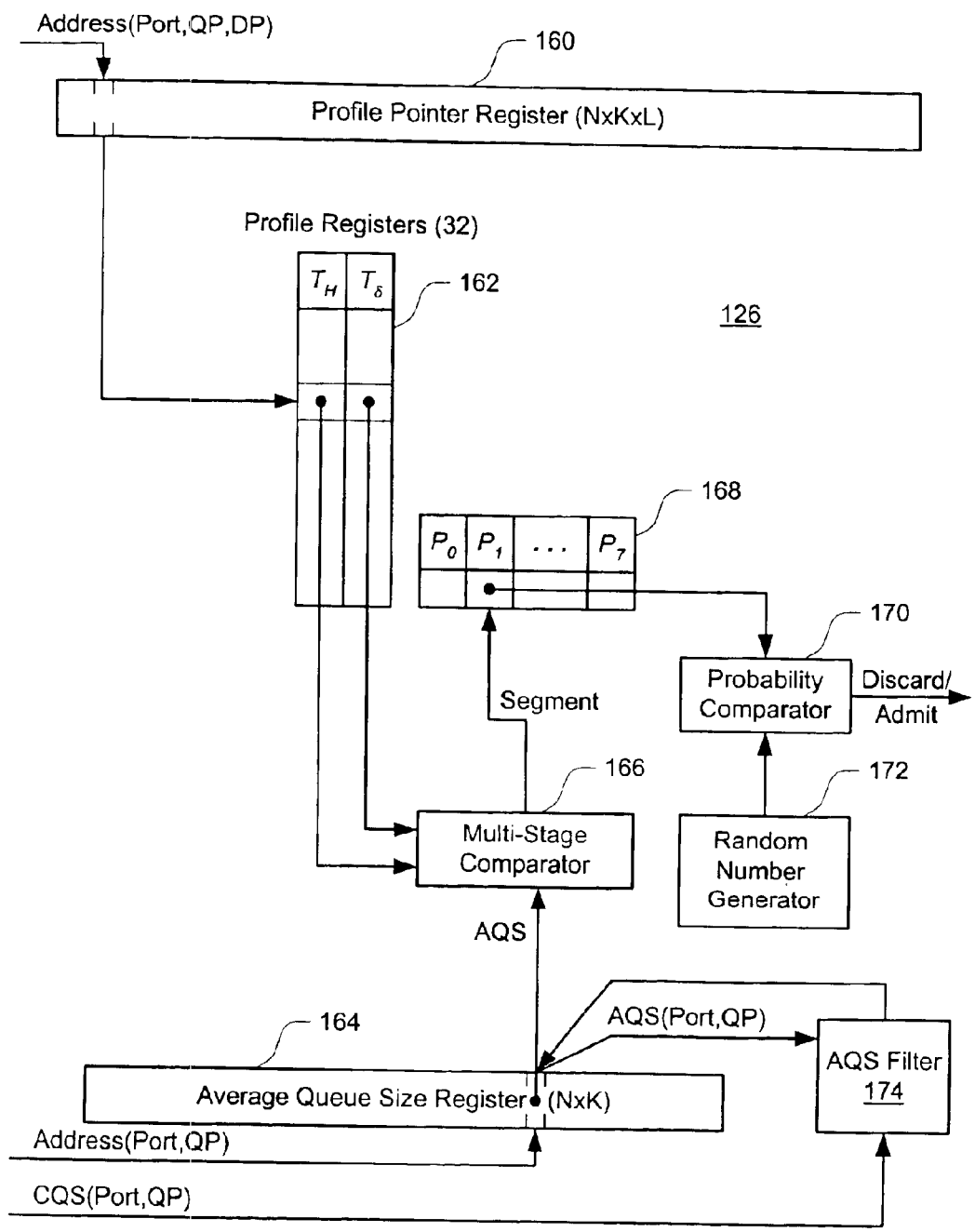
FIGS. 7 and 8 illustrate, in block diagram form, two RED processor implementations according to embodiments of the invention.

FIG. 7 depicts one embodiment for a traffic conditioner 126 (or 146). Not shown is a DSCP Marking Function (DMF), which may increase a packet's DP before RED processing. The DMF is a lookup table indexed by the packet's original DSCP, DP, QP, Peak OOP, Comt OOP, and source port ID (ingress mode) or destination port ID (egress mode), and is populated with new DSCP values for each valid index.

In addition, the DMF also computes a new DP value from the original DP value, Peak OOP, and Comt OOP. If the original drop priority for a packet is Green or Yellow and Peak OOP is set, the new DP value is changed to Red; otherwise, a Green DP is changed to Yellow if Comt OOP is set. When neither Peak OOP nor Comt OOP is set, the new DP is set to the original DP.

Traffic conditioner 126 comprises several registers, including profile pointer register 160, profile register 162, and average queue size register 164. When a packet is snooped by conditioner 126, the packet's port, QP, and DP from the DMF are used as a register index for register 160. Profile pointer register 160 has N×K×L valid indices, where N is the number of distinct ports served by the queue memory, K is the number of traffic classes, and L is the number of distinct discard priorities that a packet can have. Thus, with N=32, K=8, and L=3, the number of addressable locations needed in register 160 is 768. This allows each of the 768 possible queue/drop precedence combinations to be served by its own drop probability profile.

It is highly probable that 768 different drop probability profiles are not needed to handle the 768 different queue/drop precedence combinations that can exist in this example. Thus although such an approach is feasible, it is not the most preferred implementation.

Instead, a smaller (e.g., 32 registers) profile register array 162 stores a pool of profiles that can be shared by all queues. Profile pointer register 160 stores, for each queue/DP, a pointer to one register in array 162.

Profile register 162 accepts a five-bit address and outputs two stored values. The output of profile register 162 is a high threshold $T_H$ and a delta threshold $T_\delta$ corresponding to the five-bit address. Thresholds $T_H$ and $T_\delta$ are supplied to multi-stage comparator 166.

Average queue size register 164 stores a filtered queue size for each queue (in this example, with 32 served ports and 8 service classes, this equates to 256 filtered values). When queried by port and QP, register 164 supplies the appropriate average queue size AQS to multi-stage comparator 166.

Multi-stage comparator 166 uses $T_H$, $T_\delta$, and AQS to determine which, if any, of eight segments of the active profile that AQS falls in. The operation of multi-stage comparator 166 is explained in more detail in conjunction with the explanation of FIGS. 9–12.

Register 168 stores a set of eight drop probabilities $P_0$, $P_1$, ... $P_7$, each one corresponding to one of the eight segments. Thus in FIG. 7, when comparator 166 selects a segment $S_1$, register 168 supplies a probability $P_1$ to probability comparator 170. Note that when AQS falls outside of any segment, no drop probability is needed, as the discard/admit decision is made deterministically (admit if AQS<$T_H$-$T_\delta$, discard if AQS≧$T_H$).

Probability comparator 170 makes discard/admit decisions when AQS falls within a defined segment. Comparator 170 accepts a random number from random number generator 172, and compares the random number to the drop probability supplied by register 168. If the random number is less than the drop probability, the discard signal is asserted.

In alternate implementations, probability comparator 170 can use other dropping schemes. For instance, comparator 170 can be supplemented with a register allowing it to track how many packets m have passed through each queue since the last packet was dropped for that queue. The drop comparison can then compare the random number to $mP_i$ instead of $P_i$.

One optional element of traffic conditioner 126 is AQS filter 174 (filtered values may equivalently be calculated, e.g., by packet pipeline 122, although this requires access to register 164). Filter 174 accepts a CQS value from packet pipeline 122, along with the corresponding port and QP, when that CQS changes (or at fixed intervals). Filter 174 retrieves the corresponding AQS(Port, QP) value from register 164. After filtering, the updated AQS value is written back to AQS(Port, QP). Preferably, filter 174 implements an exponentially-weighted moving average (EWMA), e.g., represented by the equation $$AQS=AQS+2^{-n}(CQS-AQS),$$

where n is a positive integer. The exact value selected for n will depend on the desired damping characteristics, and should be used to determine the provisioned buffer size of the queue.

Figure 8:
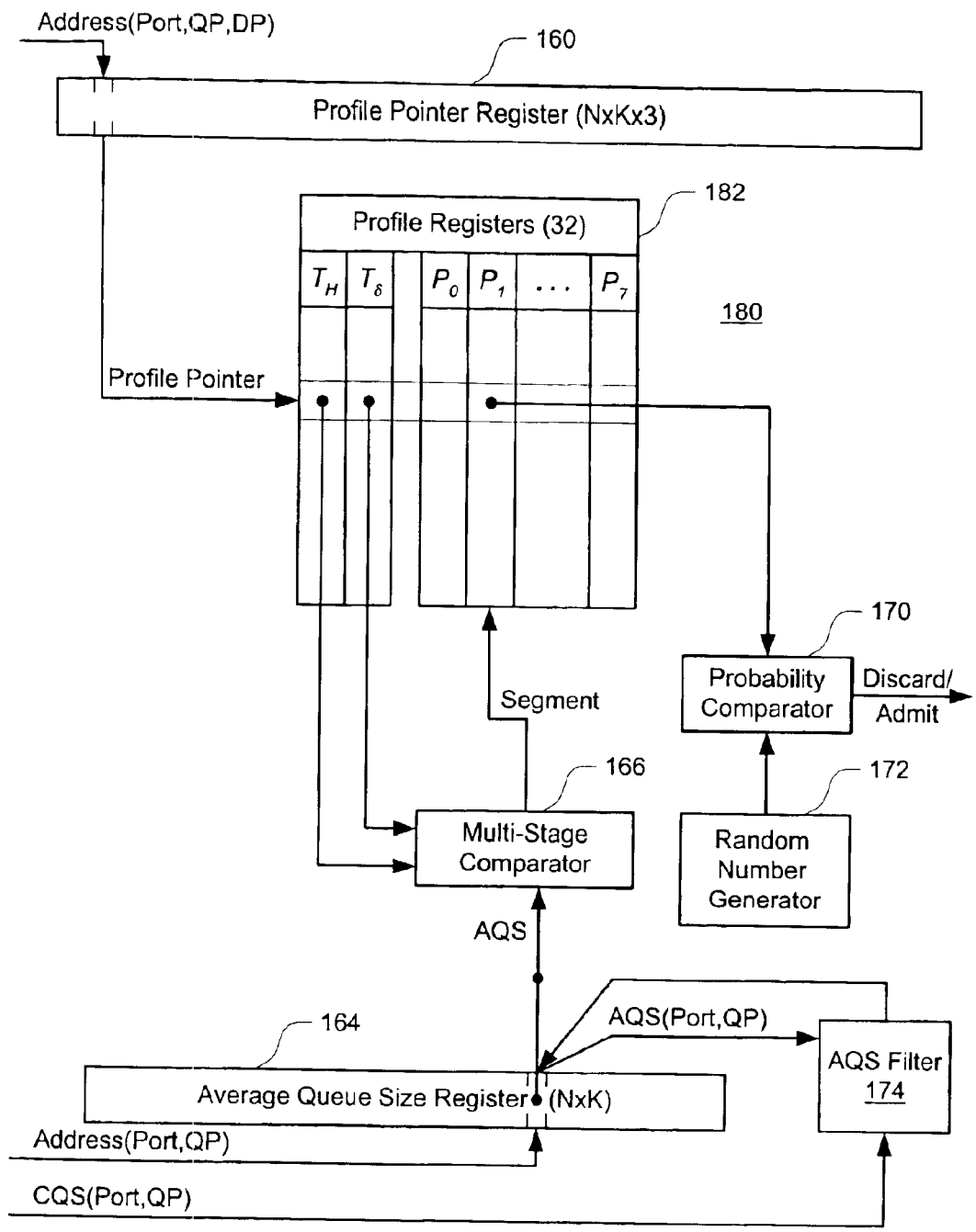

Many alternate register structures can be devised for a traffic conditioner. FIG. 8 shows another traffic conditioner embodiment 180 with a different profile register structure 182. Each profile in register 182 stores $T_H$, $T_\delta$, and a corresponding set of drop probabilities $P_0$, $P_1$, ... $P_7$. Whereas the previous embodiment allowed only dilation and translation of a single basic curve shape, embodiment 180 allows different curve shapes to be set for each profile.

Figure 9:
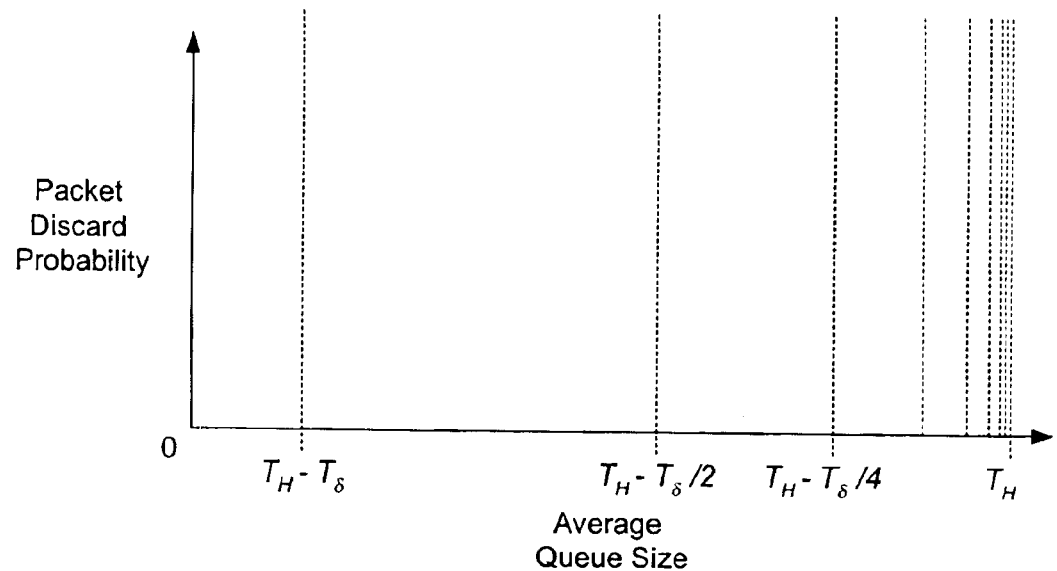
FIGS. 9 and 10 illustrate two profile segment definition schemes, relative to a high threshold and a delta threshold for a profile.

Note that although the previous discussion described profiles in terms of "segments", endpoints for the segments are not shown explicitly stored for each profile. This is because in the most preferred embodiments, multi-stage comparator 166 calculates the segment endpoints from the two parameters $T_H$ and $T_\delta$. FIG. 9 shows one set of calculated segment endpoints. With N segments $S_i$, $0 \leq i < N$, the lower endpoint for each segment $S_i$ is defined as $$T_H - T_\delta / 2^i.$$

The upper endpoint of segment $S_i$ is the lower endpoint of segment $S_{i+1}$. The upper endpoint for segment $S_{N-1}$ is simply $T_H$. Note that each segment endpoint is the result of at most one shift of $T_\delta$ and at most one add operation. The proper segment $S_i$ for AQS is the segment for which the following relationship holds true:

$$T_H - T_\delta/2^i \leq AQS < T_H - T_\delta/2^{i+1} \quad i \neq N-1$$

$$T_H - T_\delta/2^i \leq AQS < T_H \quad i = N-1$$

Of course, if $AQS < T_H - T_\delta$ then no segments evaluate true and the packet should be admitted. And if $AQS \geq T_H$, then the packet should be discarded.

Figure 10:
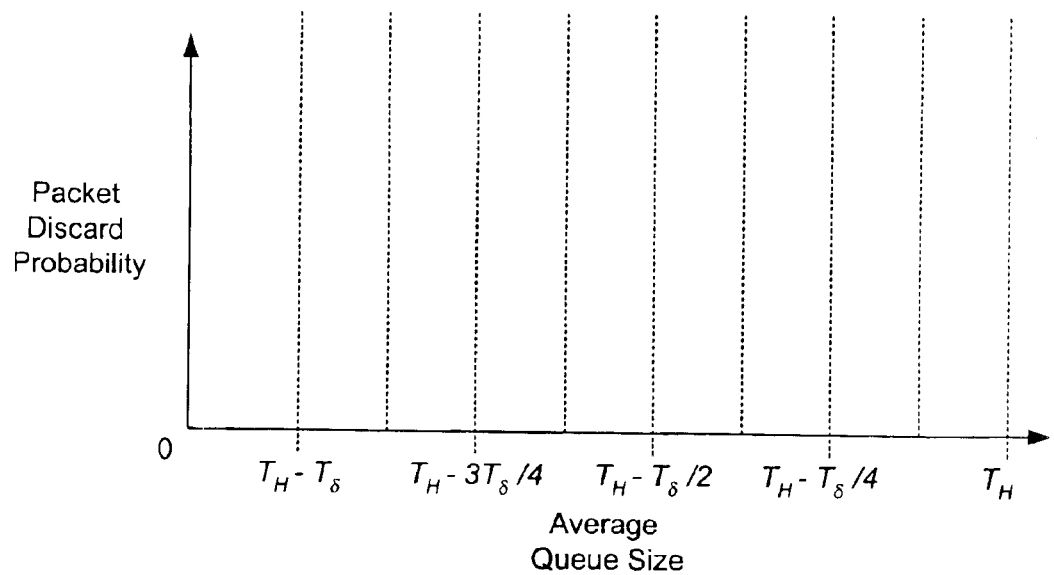

Many other predefined segment relationships are possible. For example, FIG. 10 shows a set of equally-distributed segments. Where N segments exist, this method requires only $\log_2(N)$ shifts, but some threshold calculations will require as many as $\log_2(N)$ adds.

One possibility is that more than one segment relationship maybe specified. For example, an additional bit stored with each profile could indicate whether the segmentation scheme of FIG. 9 or the scheme of FIG. 10 is to be applied to a given profile. Comparator 166 would need the flexibility to handle either segment relationship. Alternately, if memory is not at a premium, each profile could include explicit segment boundaries.

Figure 11:
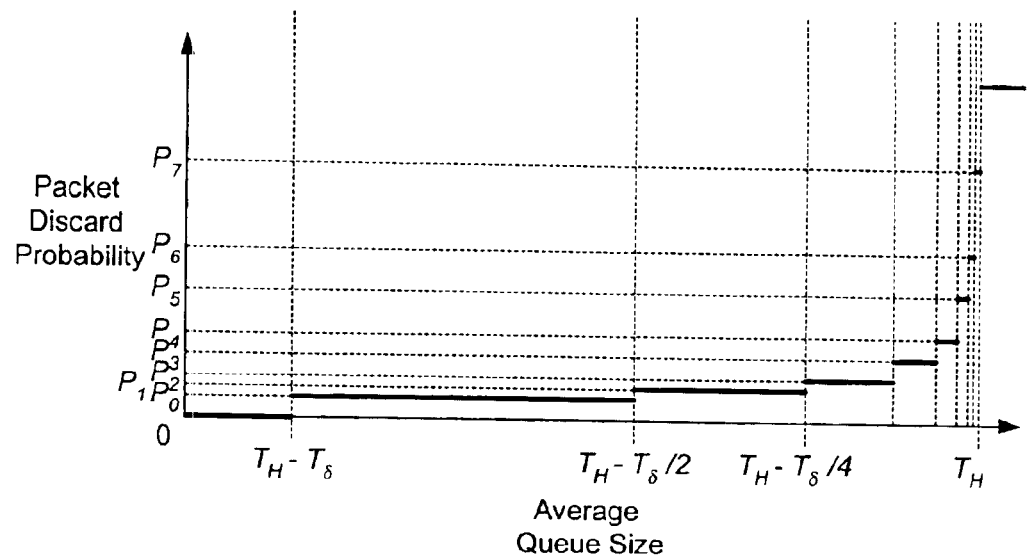
FIGS. 11 and 12 show two packet discard probability profiles that can be implemented with an embodiment of the invention.
Figure 12:
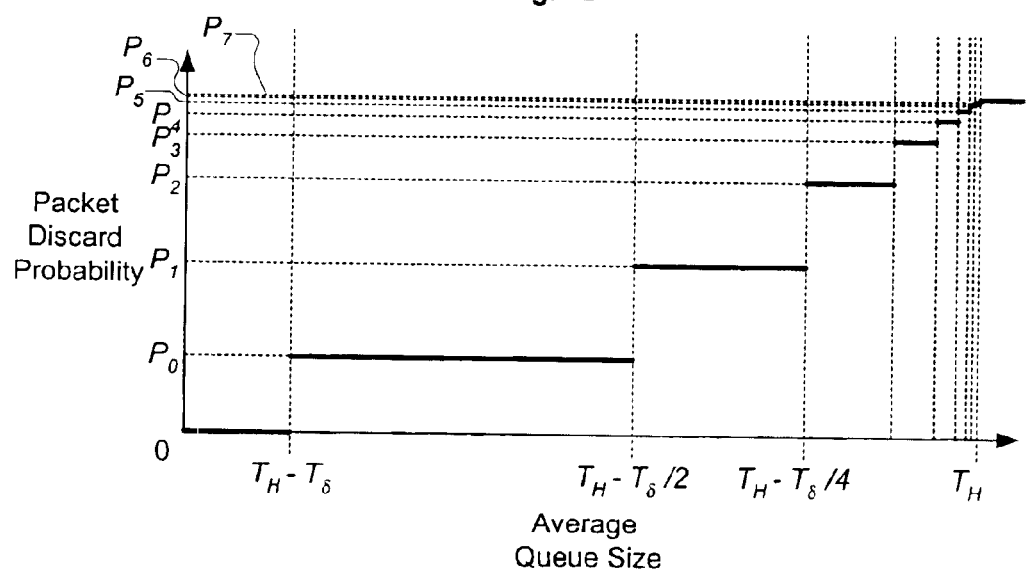

Although these alternate designs are possible, generally, the single segment relationship of FIG. 9 should be adequate to represent most packet discard probability curves if $P_i$ are set appropriately. For instance, FIG. 11 shows one curve that approximates an exponential relationship between queue size and drop probability. And FIG. 12 shows another curve that approximates a linear relationship between queue size and drop probability. Because $P_i$ are configurable, the present invention offers the ability to readily change the drop probability curve should research show that a different shape is preferable.

It should be noted at this point that a distinct advantage of the segment approach is that such an approach is amenable to a simple and fast hardware solution, no matter what shape the drop probability curve is to take. This allows for a flexible, inexpensive RED-on-a-chip implementation that can process packets at wire speed. The register implementation allows differentiated RED services to be provided inexpensively for a large number of queues, allowing a single RED-on-a-chip implementation to serve many queues. Preferably, the router's operator interface provides the capability to set the values in the profile registers as well as in the profile pointer registers.

Although the simplest approach is to select a constant drop probability $P_i$ for each segment $S_i$, other implementations are possible, e.g., the segments can be arranged in a piecewise-linear fashion.

One of ordinary skill in the art will recognize that the concepts taught herein can be tailored to a particular application in many other advantageous ways. For instance, the high/delta threshold pair could be replaced with a low/delta pair, a low/high pair, or some other equivalent set of parameters. The AQS filter need not use a power of two (although this provides a simple hardware solution), or even be an exponential filter. The filter may operate on actual data size or on number of packets. Although it is preferable that a hardware implementation of a traffic conditioner embodiment provide a single-chip solution, various registers, as well as the random number generator, may be located off-chip. Many natural division points also exist for dividing the remaining functionality among several chips. Such minor modifications are encompassed within the invention, and are intended to fall within the scope of the claims.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of implementing random early detection of congestion for a data packet queue, the method comprising:
    storing at least one configurable segment-based drop probability profile associated with the queue, each segment of the profile having a drop probability associated with a range of average queue sizes;
    receiving an average queue size AQS for the queue;
    determining whether the average queue size AQS falls within one of N segments $S_i$, $0 \leq i < N$, corresponding to the drop probability profile associated the queue; and
    basing a drop/no-drop decision, for a data packet associated with the queue, on the drop probability associated with a segment $S_i$ when AQS falls within that segment.

2. The method of claim 1, wherein each data packet assigned a drop priority from among possible drop priorities, M>1, and wherein M drop probability profiles are associated with the queue, further comprising identifying, based on the drop priority of the data packet awaiting the drop/no-drop decision, which of the M drop probability profiles to use in determining whether the average queue size AQS falls within one of N segments $S_i$.

3. The method of claim 2, wherein each of the M profiles comprises a high threshold $T_H$ and a delta threshold $T_\delta$, wherein $T_\delta$ is used to determine multiple segment boundaries, each boundary lower than $T_H$.

4. The method of claim 1, wherein the configurable drop probability profile comprises a high threshold $T_H$ and a delta threshold $T_\delta$, wherein $T_\delta$ is used to determine multiple segment boundaries, each boundary lower than $T_H$.

5. The method of claim of 4, wherein AQS falls within $S_i$ when $$T_H - T_\delta/2^i \leq AQS < T_H - T_\delta/2^{i+1} \quad i \neq N-1$$

$$T_H - T_\delta/2^i \leq AQS < T_H \quad i = N-1$$

6. The method of claim 1, wherein the segment endpoints for each segment $S_i$ are stored with the profile.

7. The method of claim 1, wherein a set of drop probabilities $P_i$ correspond respectively to the segments $S_i$, wherein basing a drop/no-drop decision comprises, when AQS falls within $S_i$, performing a random trial having two outcomes, drop and admit, where the probability of the outcome drop is approximately $P_i$.

8. The method of claim 1, wherein multiple drop probability profiles exist, and wherein one set of drop probabilities $P_i$ correspond to all profiles.

9. The method of claim 1, wherein multiple drop probability profiles exist, and wherein a set of drop probabilities $P_i$ is stored with each profile.

10. The method of claim 1, wherein multiple drop probability profiles exist, and wherein each profile further comprises a segment type identifier, the segment type identifier corresponding to one of a plurality of fixed segment distributions.

11. A method of implementing random early detection of congestion for multiple data packet queues sharing a common queue memory, the method comprising:
    maintaining a pool of drop probability profiles, the number of profiles in the pool less than the number of queues;

associating each of the data packet queues with at least one drop probability profile selected from the pool;

maintaining a queue size for each data packet queue; and forming a drop/no-drop decision for a data packet prior to queuing that data packet in its destination data packet queue, the decision based on the destination data packet queue size and the profile associated with that queue.

12. The method of claim 11, wherein each profile in the profile pool comprises a high threshold $T_H$ and a delta threshold $T_\delta$, wherein $T_\delta$ is used to determine multiple segment boundaries, each boundary lower than $T_H$.

13. The method of claim 11, wherein forming a drop/no-drop decision comprises determining whether an average queue size AQS for that queue falls within one of N drop probability profile segments $S_i$, $0 \leq i < N$.

14. The method of claim 13, wherein AQS falls within $S_i$ when $$T_H - T_\delta/2^i \leq AQS < T_H - T_\delta/2^{i+1} \quad i \neq N-1$$

$$T_H - T_\delta/2^i \leq AQS < T_H \quad i = N-1$$

15. The method of claim 13, wherein the segment endpoints for each segment $S_i$ are stored with the profile.

16. The method of claim 13, wherein a set of drop probabilities $P_i$ correspond respectively to the segments $S_i$, wherein using the profile associated with a queue further comprises, when AQS falls within $S_i$, performing a random trial having two outcomes, drop and admit, where the probability of the outcome drop is approximately $P_i$.

17. The method of claim 16, wherein one set of drop probabilities $P_i$ correspond to all profiles.

18. The method of claim 13, wherein a set of drop probabilities $P_i$ is stored with each profile.

19. The method of claim 13, wherein each profile further comprises a segment type identifier, the segment type identifier corresponding to one of a plurality of fixed segment distributions.

20. The method of claim 11, wherein each data packet is assigned a drop priority from among M possible drop priorities, and wherein each data packet queue is associated with M drop probability profiles, wherein using the profile associated with that queue to arrive at the drop/no-drop decision comprises using the profile associated with that queue and the drop priority of that data packet.

21. An integrated circuit comprising:

a profile register to store an array of segment-based drop probability profiles;

a profile matcher to accept a data packet queue identifier and select an active drop probability profile, from the array of drop probability profiles, that is associated with the data packet queue identifier, a segment selector to accept an average queue size AQS associated with the selected data packet queue and the active drop probability profile, the selector identifying the segment of the active profile within which AQS falls; and a probability comparator to accept a drop probability corresponding to the segment identification from the segment selector, the comparator producing a random packet-drop signal with a probability approximately equal to the drop probability.

22. The circuit of claim 21, wherein the drop probability profile configuration of the profile register comprises a high threshold $T_H$ and a delta threshold $T_\delta$ for each entry in the array, wherein $T_\delta$ is used to determine multiple segment boundaries, each boundary lower than $T_H$.

23. The circuit of claim 22, wherein the segment selector has the capability to identify the segment as one of N segments $S_i$, $0 \leq i < N$, wherein the identified segment $S_i$ is the segment for which $$T_H - T_\delta/2^i \leq AQS < T_H - T_\delta/2^{i+1} \quad i \neq N-1$$

$$T_H - T_\delta/2^i \leq AQS < T_H \quad i = N-1$$

24. The circuit of claim 22, wherein the drop probability profile configuration of the profile register further comprises a set of drop probabilities, corresponding respectively to the possible segment identification values produced by the segment selector.

25. The circuit of claim 22, wherein the drop probability profile configuration of the profile register further comprises a set of segment endpoints.

26. The circuit of claim 22, wherein the drop probability profile configuration of the profile register further comprises a segment type identifier, the segment type identifier corresponding to one of a plurality of fixed segment types defined for the circuit.

27. The circuit of claim 21, wherein the profile matcher comprises a profile pointer register having at least one entry corresponding to each valid data packet queue identifier, the profile matcher selecting an active drop probability profile by returning a pointer associated with the data packet queue identifier.

28. The circuit of claim 27, wherein the profile matcher further accepts a drop priority identifier, and wherein, for each valid data packet queue identifier, the profile pointer register has one entry corresponding to each valid drop priority identifier, the profile matcher selecting an active drop probability profile by returning the register entry corresponding to the data packet queue identifier and the drop priority identifier.

29. The circuit of claim 21, further comprising:

an average queue size register to store an array of average queue size elements $AQS_i$, one element corresponding to each valid data packet queue identifier, and to supply the array element corresponding to the data packet queue identifier to the segment selector as AQS; and an average queue size filter to update an average queue size element $AQS_i$ with a current queue size $CQS_i$, where both $AQS_i$ and $CQS_i$ are associated with a selected data packet queue.

30. The circuit of claim 29, wherein the filter operates according to the equation $$AQS_i = AQS_i + \alpha(CQS_i - AQS_i),$$

where $0 < \alpha < 1$.

31. The circuit of claim 30, wherein $\alpha = 2^{-n}$, where n is a positive integer.

32. The circuit of claim 21, further comprising a random number generator to generate random numbers for use by the probability comparator.

33. A packet routing device comprising:

a packet pipeline to receive and delay a packet;

a multiple-queue packet memory to receive a packet into the queue designated for that packet, when that packet reaches the end of the packet pipeline without being dropped; and a random early detection traffic conditioning circuit to snoop queue information from the packet while the packet is in the pipeline, the circuit having the capability to select a segment-based drop probability profile corresponding to the queue information and produce a packet drop/no-drop decision based on that profile before the packet reaches the end of the pipeline.

34. The device of claim 33, wherein the packet pipeline has the capability to maintain the current queue size for each queue in the multiple-queue packet memory, and wherein the random early detection circuit uses the current queue size from the packet pipeline to maintain an average queue size for each queue in the multiple-queue packet memory.

35. The device of claim 33, wherein the queue information corresponds to a destination port and a traffic class for the packet.

36. The device of claim 33, wherein the random early detection circuit accepts a drop priority for the packet, and where the selection of a drop probability profile depends on the drop priority as well as on the destination port and traffic class of the packet.

37. The device of claim 36, further comprising a traffic monitor circuit to produce the drop priority for the packet while the packet is in the packet pipeline.

38. The device of claim 33, wherein the random early detection circuit comprises a bank of user-configurable drop probability profiles and a user-configurable profile pointer register having at least one pointer, pointing to a drop probability profile from the bank, for each queue in the multiple-queue packet memory, the random early detection circuit using the queue information to select a profile pointer from the register, thereby selecting the drop probability profile corresponding to the queue information.

39. The device of claim 33, further comprising multiple packet ingress interfaces, each ingress interface coupled to supply packets to the packet pipeline.

40. An apparatus comprising a computer-readable medium containing computer instructions that, when executed, cause a processor or multiple communicating processors to perform a method for random early detection of congestion in a data packet queue, the method comprising:

storing at least one configurable segment-based drop probability profile associated with the data packet queue, each segment of the profile having a drop probability associated with a range of average queue sizes;

receiving an average queue size AQS for the queue;

determining whether the average queue size AQS falls within one of N segments $S_i$, $0 \leq i < N$, corresponding to the drop probability profile associated with the queue; and basing a drop/no-drop decision, for a data packet associated with the queue, on the drop probability associated with a segment $S_i$ when AQS falls within that segment.

41. The apparatus of claim 40, wherein each data packet is assigned a drop priority from among M possible drop priorities, and wherein M drop probability profiles are associated with the queue, further comprising identifying, based on the drop priority of the data packet awaiting the drop/no-drop decision, which of the M drop probability profiles to use in determining whether the average queue size AQS falls within one of N segments $S_i$.

42. An apparatus comprising a computer-readable medium containing computer instructions that, when executed, cause a processor or multiple communicating processors to perform a method for random early detection of congestion in multiple data packet queues sharing a common queue memory the method comprising:

maintaining a pool of drop probability profiles, the number of profiles in the pool less than the number of queues;

dynamically associating each of the data packet queues with at least one drop probability profile selected from the pool;

maintaining a queue size for each data packet queue; and forming a drop/no-drop decision for a data packet prior to queuing that data packet in its destination data packet queue, the decision based on the destination data packet queue size and the profile associated with that queue.

* * * * *

UNITED STATES PATENT AND TRADEMARK OFFICE
CERTIFICATE OF CORRECTION

PATENT NO. : 6,904,015 B1
DATED : June 7, 2005
INVENTOR(S) : Chen et al.

It is certified that error appears in the above-identified patent and that said Letters Patent is hereby corrected as shown below:

Column 10,
Line 18, insert -- with -- after "associated";
Line 22, insert -- is -- after "packet";
Line 23, insert -- M -- after "among";
Line 37, delete "of" after "claim".

Column 11,
Line 52, delete "," and replace with -- ; --.

Column 14,
Line 25, insert -- , -- after "memory".

Signed and Sealed this

Twenty-eighth Day of March, 2006

JON W. DUDAS
*Director of the United States Patent and Trademark Office*